US 11,541,574 B2

(12) United States Patent
Feltrin

(10) Patent No.: US 11,541,574 B2
(45) Date of Patent: Jan. 3, 2023

(54) BICYCLE WHEEL RIM

(71) Applicant: Campagnolo S.r.l., Vicenza (IT)

(72) Inventor: Mauri Feltrin, Nanto (IT)

(73) Assignee: Campagnolo S.r.l., Vicenza (IT)

( * ) Notice: Subject to any disclaimer, the term of this patent is extended or adjusted under 35 U.S.C. 154(b) by 428 days.

(21) Appl. No.: 16/155,516

(22) Filed: Oct. 9, 2018

(65) Prior Publication Data

US 2019/0105807 A1 Apr. 11, 2019

(30) Foreign Application Priority Data

Oct. 10, 2017 (IT) .................. 102017000113948

(51) Int. Cl.
| | |
|---|---|
| *B60B 5/02* | (2006.01) |
| *B29C 33/00* | (2006.01) |
| *B29C 70/34* | (2006.01) |
| *B29C 70/54* | (2006.01) |
| *B60B 21/06* | (2006.01) |
| *B29K 679/00* | (2006.01) |

(Continued)

(52) U.S. Cl.
CPC .......... *B29C 33/0033* (2013.01); *B29C 70/34* (2013.01); *B29C 70/545* (2013.01); *B60B 5/02* (2013.01); *B60B 21/062* (2013.01); *B29C 70/22* (2013.01); *B29C 2793/0018* (2013.01); *B29K 2679/085* (2013.01); *B29K 2701/12* (2013.01); *B29L 2031/3091* (2013.01); *B29L 2031/32* (2013.01); *B60B 2310/204* (2013.01); *B60B 2310/80* (2013.01); *B60B 2360/341* (2013.01); *B60B 2360/3412* (2013.01); *B60B 2360/3416* (2013.01); *B60B 2900/311* (2013.01); *B60B 2900/321* (2013.01); *B60B 2900/325* (2013.01)

(58) Field of Classification Search
CPC ......... B60B 5/02; B60B 21/02; B60B 21/062; B60B 21/025; B60B 21/04; B60B 2360/341; B60B 2360/344
See application file for complete search history.

(56) References Cited

U.S. PATENT DOCUMENTS

| | | |
|---|---|---|
| 579,521 A | 3/1897 | Parker |
| 1,483,740 A | 2/1924 | Montgomery |
| (Continued) | | |

FOREIGN PATENT DOCUMENTS

| | | |
|---|---|---|
| CN | 206501646 | 9/2017 |
| DE | 10 2015 102 465 A1 | 8/2016 |
| (Continued) | | |

OTHER PUBLICATIONS

Italian Search Report and Written Opinion in Italian Application No. 102017000113948, dated Jul. 3, 2018, with English translation.

(Continued)

*Primary Examiner* — Scott A Browne
(74) *Attorney, Agent, or Firm* — Volpe Koenig

(57) ABSTRACT

A composite rim for a bicycle wheel that has a wall of structural fibers incorporated in a thermosetting polymeric material and a plurality of spoke attachment seats. The composite material includes at least one layer of woven bi-directional fibers where some fibers are in a nominal direction substantially parallel to the circumferential direction of the rim and some fibers are substantially orthogonal to the circumferential direction of the rim.

22 Claims, 4 Drawing Sheets

(51) Int. Cl.
  *B29K 701/12* (2006.01)
  *B29L 31/30* (2006.01)
  *B29L 31/32* (2006.01)
  *B29C 70/22* (2006.01)

(56) References Cited

U.S. PATENT DOCUMENTS

| | | | |
|---|---|---|---|
| 3,408,770 A | 11/1968 | Smolinksi | |
| 3,568,748 A | 3/1971 | Paine | |
| 4,294,490 A * | 10/1981 | Woelfel | B29C 53/60 |
| | | | 301/64.703 |
| 4,483,729 A * | 11/1984 | Fujisaki | B29C 70/202 |
| | | | 152/411 |
| 4,532,097 A * | 7/1985 | Daniels | B29C 70/081 |
| | | | 264/258 |
| 5,549,360 A * | 8/1996 | Lipeles | B60B 5/02 |
| | | | 301/64.703 |
| 5,725,284 A | 3/1998 | Boyer | |
| 5,985,072 A * | 11/1999 | Finck | B29C 63/18 |
| | | | 156/184 |
| 6,347,839 B1 * | 2/2002 | Lew | B29C 70/345 |
| | | | 301/95.102 |
| 6,890,470 B2 * | 5/2005 | Staub | B64C 9/02 |
| | | | 264/255 |
| 6,991,300 B2 * | 1/2006 | Colegrove | B60B 5/02 |
| | | | 188/24.13 |
| 7,377,595 B1 * | 5/2008 | Okajima | B60B 21/023 |
| | | | 301/58 |
| 7,858,011 B2 * | 12/2010 | Reuteler | B60B 5/02 |
| | | | 264/501 |
| 8,313,155 B2 * | 11/2012 | Schiers | B60B 1/043 |
| | | | 301/95.107 |
| 8,888,195 B1 | 11/2014 | Hed et al. | |
| 9,724,959 B2 | 8/2017 | Meggiolan | |
| 10,005,245 B2 * | 6/2018 | Lin | B60B 25/00 |
| 10,723,172 B2 * | 7/2020 | Walls-Bruck | B60B 21/028 |
| 11,267,281 B2 * | 3/2022 | Feltrin | B60B 25/22 |
| 2002/0108249 A1 | 8/2002 | Meggiolan | |
| 2005/0087276 A1 | 4/2005 | Kaplan | |
| 2006/0096685 A1 | 5/2006 | Fukui | |
| 2006/0200989 A1 * | 9/2006 | Possarnig | B60B 21/025 |
| | | | 29/894.35 |
| 2007/0059505 A1 * | 3/2007 | Williams | B29C 70/12 |
| | | | 428/292.1 |
| 2008/0296961 A1 * | 12/2008 | Dal Pra' | B60B 21/04 |
| | | | 301/95.103 |
| 2010/0090518 A1 | 4/2010 | Schiers | |
| 2010/0092770 A1 * | 4/2010 | Wadahara | C08J 5/24 |
| | | | 428/339 |
| 2012/0242138 A1 * | 9/2012 | Tsai | B29C 70/446 |
| | | | 301/95.103 |
| 2013/0057050 A1 * | 3/2013 | Matsui | B60B 21/062 |
| | | | 301/95.102 |
| 2014/0117745 A1 | 5/2014 | Wilke et al. | |
| 2014/0191566 A1 | 7/2014 | Burlefinger et al. | |
| 2015/0027611 A1 | 1/2015 | Mercat | |
| 2015/0144239 A1 | 5/2015 | Hiscock | |
| 2015/0224820 A1 | 8/2015 | Teixeira | |
| 2016/0159141 A1 | 6/2016 | Satterthwaite et al. | |
| 2016/0243732 A1 * | 8/2016 | Wissler | B29C 43/027 |
| 2016/0243893 A1 | 8/2016 | Wissler et al. | |
| 2017/0100960 A1 * | 4/2017 | Fabris | B60B 21/08 |
| 2019/0061289 A1 * | 2/2019 | Xiao | B29C 70/86 |
| 2019/0168538 A1 * | 6/2019 | Feltrin | B60B 1/003 |

FOREIGN PATENT DOCUMENTS

| | | | |
|---|---|---|---|
| EP | 1 328 409 | | 7/2003 |
| EP | 2 422 959 A1 | | 2/2012 |
| EP | 2 674 304 A1 | | 12/2013 |
| EP | 2 829 417 A1 | | 1/2015 |
| EP | 3 208 104 A1 | | 8/2017 |
| FR | 2829969 A1 | | 3/2003 |
| GB | 2413114 A | | 10/2006 |
| TW | 544405 | | 8/2003 |
| WO | 02/26510 A1 | | 4/2002 |
| WO | 2013/037428 A1 | | 3/2013 |
| WO | WO-2014129900 A1 * | 8/2014 | B60B 21/104 |

OTHER PUBLICATIONS

Taiwanese Office Action for App. No. 107135330, dated Dec. 15, 2022. English translation attached.

European Office Action for App. No. 18199258.7-1012, dated May 19, 2022. English translation attached.

* cited by examiner

BICYCLE WHEEL RIM

CROSS REFERENCE TO RELATED APPLICATION

This application claims the benefit of Italian Patent Application No. 102017000113948, filed on Oct. 10, 2017, which is incorporated herein by reference as if fully set forth.

FIELD OF INVENTION

The invention relates to a bicycle wheel rim. In particular, the rim is at least partially made of a composite material comprising structural fibers incorporated in a thermosetting polymeric material.

BACKGROUND

Bicycle rims made of composite material are known and they are typically manufactured through compression moulding, with a variety of cross-sectional shapes Because the rim is associated with a hub to form a bicycle wheel typically through spokes—which can by the way be used only during a manufacturing step of a lenticular or disc wheel or of a spider wheel as described in EP 2674304 A1 and equivalent U.S. Pat. No. 9,724,959, both of which are incorporated herein by reference—a plurality of spoke attachment seats have to be made in the rim.

In the present description and in the attached claims, the term "spoke attachment seat" is used in a broad sense, so as to include both a seat in which a spoke is directly inserted, for example provided with an enlarged head or with a threading, and a seat in which a nipple or other spoke attachment element is inserted; for the sake of brevity, the expression "hole" will also be used hereinafter.

It is also possible to provide for a plurality of openings in the rim, for the passage of fixing nipples.

The holes and the possible openings are made in the positions required by the spoke pattern of the particular wheel, namely according to the number of spokes, to their distribution along the circumference of the rim, to their position in the cross section of the rim, and to the direction taken up by each spoke, for example due to its radial or tangential attachment to the hub and/or the camber angle. Usually, the holes are made on a wall of the rim that is located in a radially inner region of the rim.

In the present description and in the attached claims, the terms "inner" and "outer" refer to the radial direction of the bicycle rim, to indicate proximal and distal, respectively, with respect to the axis of rotation of the rim.

In order to make the spoke attachment seats, in most known processes the rim is first moulded and then transferred to a perforation station where a machine is suitably programmed with the perforation data.

EP 2422959 A1 discloses a process for manufacturing a spoked bicycle wheel rim at least in part made of composite material, comprising the steps of moulding a composite material comprising structural fiber incorporated in polymeric material into the shape of at least part of a bicycle rim, and forming at least one spoke attachment seat in said at least one part of bicycle rim, wherein said step of forming at least one seat is carried out with displacement of structural fiber before said moulding step. The document also discloses a bicycle rim comprising a wall made of composite material comprising structural fibers incorporated in a polymeric material and a plurality of spoke attachment seats, wherein at least one seat comprises a hole in said wall and at least one amassment of structural fibers in a neighbourhood of the hole. By making the seats through displacement of structural fiber and therefore substantially without removal of structural fiber, the holes are substantially devoid of sheared fibers and the rim is stronger.

The structural fibers of the composite material used in the aforementioned document are preferably woven, the material being arranged so that the weft and warp directions form an angle of ±45° with the circumferential direction of the rim; alternatively, the structural fibers of said composite material can be unidirectional, wherein different layers are arranged so that the directions of the fibers form angles of opposite direction, and preferably of +45° and −45°, with the circumferential direction of the rim.

U.S. Pat. No. 8,313,155 also discloses a process for making holes in a rim during moulding, as well as a rim made of composite material comprising structural fibers made of a laminated thermoplastic or thermosetting material, wherein the fibers in different fiber plies can have different orientations so as to provide the rim with the desired features of strength and stiffness in the various directions. In particular, the document discloses that layers of unidirectional fiber extending substantially along the circumferential direction of the rim are responsible for the hoop strength, whereas fibers extending in a radial direction or at an acute angle relative to the circumferential direction add rigidity and structural integrity to the rim.

The Applicant observes that the radial direction of a rim extends from the center of the rim—namely from the axis of the hub of the wheel—to the periphery of the rim, crossing the most radially inner wall of the rim in the direction of the thickness thereof, and believes that the fibers extending in a radial direction are not particularly effective.

The technical problem at the basis of the invention consists of providing for a bicycle wheel rim that properly maintains the nominal geometry and is particularly strong.

SUMMARY

In one aspect, the invention relates to a bicycle wheel rim comprising a wall made of composite material comprising structural fibers incorporated in a thermosetting polymeric material, and a plurality of spoke attachment seats formed in said wall, characterized in that the composite material of the wall comprises at least one layer of woven bi-directional fibers, comprising first fibers, the nominal direction of which is substantially parallel to the circumferential direction of the rim, and second fibers, the nominal direction of which is substantially orthogonal to that of the first fibers.

The Applicant has recognized that the layer of bi-directional fibers oriented according to the invention provides the rim with remarkable strength, because the first fibers provide resistance against the deformations away from the circular shape, caused for example by the different tension of the various spokes as well as by roughness of the terrain, while the second fibers provide resistance against lateral impacts.

BRIEF DESCRIPTION OF THE DRAWINGS

The features and advantages of the invention will become clearer from the description of preferred embodiments thereof, made with reference to the attached drawings, wherein.

DETAILED DESCRIPTION OF THE PREFERRED EMBODIMENTS

Figure 1:
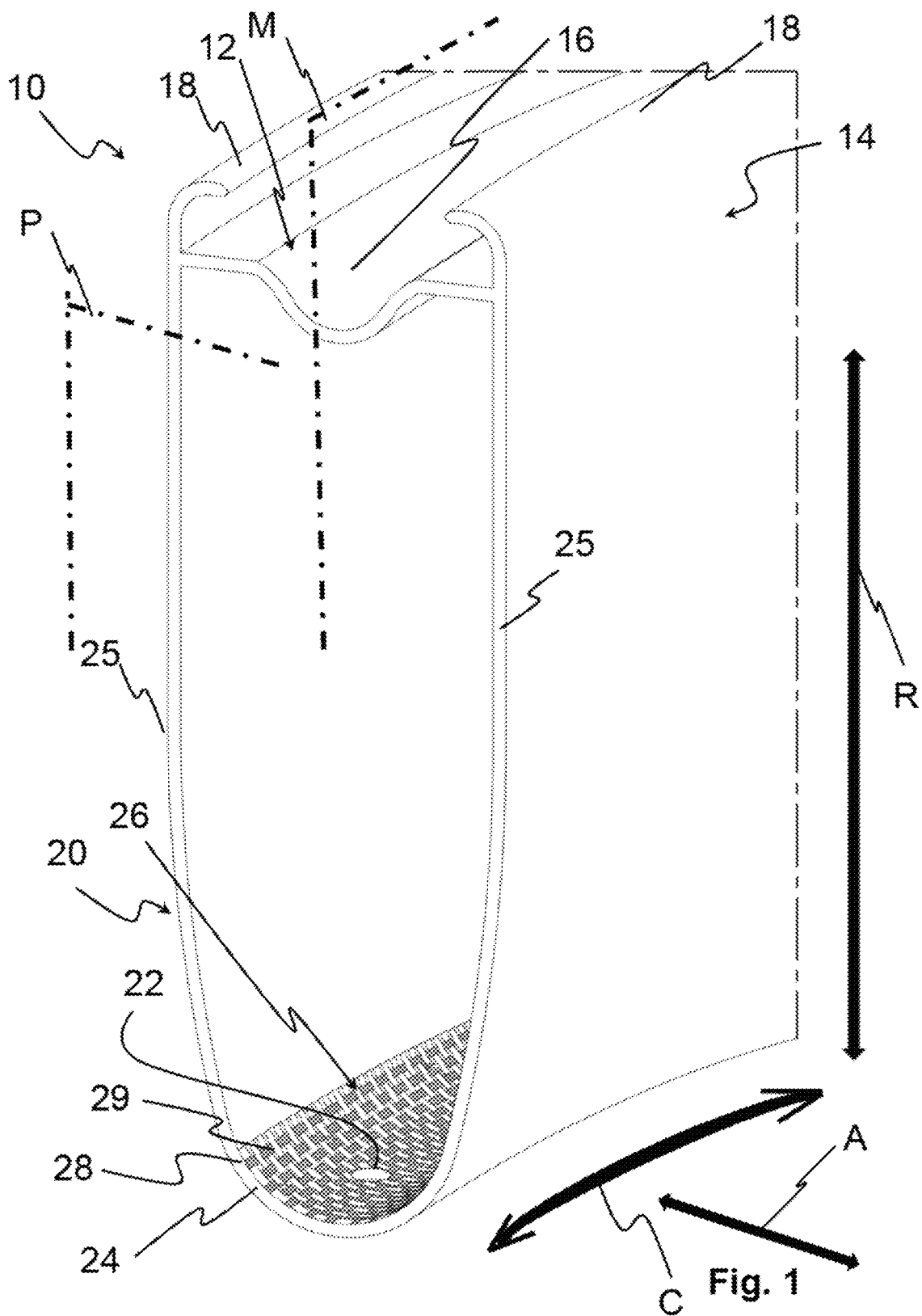
FIG. 1 schematically illustrates a perspective view of a portion of a first embodiment of a bicycle wheel rim according to the invention, highlighting a radial section thereof.

In the present description and in the attached claims, the expression "wall" is meant in a broad sense so as to include both a cylindrical wall—namely flat in a radial section of the rim—and a non-cylindrical wall, although typically extending on a surface of revolution; such expression is also meant in a broad sense so as to include both a wall that joins to other walls of the rim with a sudden change of curvature or according to a sharp angle and it is thus distinguishable therefrom, and a wall that joins to other walls without a sudden change of curvature or without forming a sharp angle and thus it is not clearly distinguishable therefrom.

In the present description and in the attached claims, under the expression "nominal direction", the direction is meant to be indicated according to which the fibers are designed to extend in the starting composite material, as well as according to which the fibers, considered as extending as thus designed, are deliberately arranged in the mould; moreover, in a practical embodiment, the fibers will deviate from such nominal direction both by means of the deviations in the woven starting material, and by undesired deviations in the positioning in the mould, as well as by movements during moulding. A deviation from the nominal direction of the order of 10° is deemed totally negligible and falling within the wording of the claims.

In the present description and in the attached claims, under "radial section" a section carried out through a half-plane having the axis of rotation as origin is meant to be indicated.

Since typically the spoke attachment wall has a radial section that—at least in a central area thereof, namely straddling the median plane of the rim—is substantially flat and extends in axial direction, at least in such a region the second fibers thus extend in the axial direction.

Thus far, in the field of bicycle rims, the arrangement of the composite material so that the fibers thereof extended along the aforementioned directions had always been avoided, probably because this exacerbates the problem of the non-uniformity of the density of fiber per unit area. The density of the second fibers oriented in the radial sections is very poorly constant, since two adjacent fibers are at a minimum distance from one another—measured in the circumferential direction—in the most radially inner position, and at a maximum distance from one another in the most radially outer position. On the other hand, by arranging the fibers at two equal and opposite acute angles with respect to the circumferential direction, for example at ±45° as described for example in the aforementioned prior art documents, the differences in density in the two directions compensate each other.

Moreover, the second fibers, interwoven with the first fibers, stabilize the first fibers in their nominal circumferential direction and in the respective position in the various planes parallel to the median plane of the rim—i.e., in the respective position along the radial section—, avoiding delamination issues at the sides of the layer of composite material, namely at the most axially outer first fibers, on either side of the rim.

In the present description and in the attached claims, under "median plane" of the rim a plane orthogonal to the axis of rotation of the rim and passing through an axially intermediate point of the radially outer surface of the rim is meant to be indicated.

In particular, the stabilization effect that the second fibers interwoven with the first fibers have on the first fibers themselves allows the wall under consideration to be made wider in the radial section with respect to fibers with known orientation, namely the layer of composite material can climb more the lateral walls of the rim without the occurrence of delamination or curling of the material during or after moulding, with advantages in terms of strength of the rim.

Preferably, the nominal direction of the second fibers substantially extends along the wall in a radial section of the rim.

Advantageously, in said at least one layer of bi-directional fibers, the first fibers and the second fibers form substantially uniform meshes.

Preferably, in said at least one layer of bi-directional fibers the stiffness of the first fibers is greater than or equal to the stiffness of the second fibers.

Advantageously, the stiffness of the structural fibers is expressed as the product of: dry fiber grammage of the structural fibers, dry fiber tensile strength of the structural fibers, and dry fiber density of the structural fibers.

The Applicant has indeed recognized that the advantageous effect in terms of stabilization in position of the first fibers is already obtained with a low stiffness of second fibers, determined for example by their lower density, which does not result in high costs and weights.

Preferably, the ratio between stiffness of the first fibers and stiffness of the second fibers of said at least one layer is comprised between about 90:10 and about 50:50, end-points included, more preferably it is comprised between about 70:30 and about 60:40, end-points included.

While progressively passing from the range end-point 90:10 to the range end-point 50:50, both the effect of stabilization in position of the first fibers and the resistance to lateral impacts improve, however at the expense of an increased price, weight and worsening of processability.

Preferably, the bi-directional fibers are selected from the group consisting of carbon fibers, glass fibers, boron fibers, synthetic fibers, ceramic fibers and combinations thereof, the material of the first fibers being selected independently of the material of the second fibers.

Preferably, the synthetic fibers comprise polyoxazoline fibers, for example Zylon®, ultra-high molecular weight polyethylene fibers, for example Dyneema®, aramid fibers, for example Kevlar fibers, and combinations thereof.

Preferably, the first fibers are carbon fibers.

Preferably, moreover, the second fibers are fibers different than carbon fibers, more preferably they are glass fibers.

Preferably, the first and the second fibers are woven according to a plain weave or a twill weave.

Advantageously, each of these two types of weave maximizes the aforementioned effects of the second fibers interwoven with the first fibers. Other types of weave are also possible.

Preferably, the first and second fibers have a dry fiber grammage comprised in the range between 80 and 800 g/m2, more preferably between 100 and 300 g/m2 and even more preferably between 100 and 200 g/m2. The various ranges are meant to include end-points. Moreover, the value of the first fibers is meant to be selected independently of the value of the second fibers. Finally, the various values indicated above refer to the dry fiber, not yet impregnated with thermosetting polymeric material.

In a particularly preferred manner, the first fibers have a grammage of about 200 g/m2 and the second fibers have a grammage of about 100 g/m2.

Preferably, the first and second fibers have a tow size selected for example among 1 k, 3 k, 6 k, 12 k, 24 k, 50 k, namely among 1, 3, 6, 12, 24 and 50 thousands of filaments for each tow, more preferably 24K, namely about 24,000 filaments for each tow. Also in this case, the value of the first fibers is meant to be selected independently of the value of the second fibers.

Preferably, the first and second fibers have a tensile strength comprised in the range between 6600 MPa and 2500 MPa, more preferably between 6400 MPa and 3500 MPa, more preferably between 6000 MPa and 4500 MPa. Also in this case, the various ranges are meant to include end-points. Moreover, the value of the first fibers is meant to be selected independently of the value of the second fibers. Finally, the various values indicated above refer to the dry fiber, not yet impregnated with thermosetting polymeric material.

Preferably, the first and second fibers have a density comprised in the range between 0.9 g/cm3 and 3.5 g/cm3, more preferably between 1.7 and 2.7 g/cm3 and even more preferably between 1.8 and 2.3 g/m2, end-points included. Again, the various ranges are meant to include end-points. Moreover, the value of the first fibers is meant to be selected independently of the value of the second fibers. Finally, the various values indicated above refer to the dry fiber, not yet impregnated with thermosetting polymeric material.

A particularly preferred material is the fiber produced by Toray Industries, Inc., Tokyo, Japan, under the trade names T300, T700, T800, T1000.

Typically, said wall delimits the rim in its radially inner region.

Such a wall is often indicated as lower bridge in the field.

However, the wall herein of concern can also be the radially outer wall (upper bridge).

Preferably, each seat comprises a hole in said wall and at least one amassment of structural fibers, and possibly of polymeric material, in a neighbourhood of the hole.

In this way, some bi-directional fibers take up a substantially curvilinear progression about the hole, in particular substantially semi-circular.

In the present description and in the attached claims, under "neighbourhood" of a hole, a region extending about the hole, having a size comparable to that of the hole itself, or even less than that of the hole, is meant to be indicated.

In the present description and in the attached claims, under the term "amassment of structural fibers" a region in which the local density of fibers is greater than a nominal density of the fibers in the composite material is meant to be indicated. Therefore, if the composite material has a determined nominal density of fibers, it will have, in every region of the wall distant from the holes, and in particular out of the neighbourhood of the hole, a density of fibers within a tolerance range about the nominal density and, in at least one region in the neighbourhood of the hole, a density of fibers greater than the upper end-point of such tolerance range.

For example, the seats can be made according to the teachings of document EP 2422959 A1 cited above, herein incorporated by reference.

In particular, the step of forming each seat can be carried out by inserting a pointed but not cutting tool through the meshes formed by the structural fibers—preferably preimpregnated with the thermosetting polymeric material, but in principle also in dry conditions—into a hole of a mould in which moulding of the rim is carried out, so that the hole of the mould univocally defines the position and the direction of the seat. Thanks to the fact that the composite material has not been set yet through moulding and that therefore the fibers can move within the matrix of polymeric material, the fibers are progressively displaced by the tip of the tool; such a progression of the fibers remains in the finished rim even after the moulding step.

Preimpregnated composite materials are in general known in the field as Sheet Moulding Compounds (SMC) or "prepreg".

Instead of using preimpregnated composite material, it is possible to use dry fiber material during the initial steps of the process, so that in particular the perforation step can take place only on the fiber material. The polymeric material is subsequently injected, preferably at several points, to incorporate the fiber material, before the application of the temperature and pressure profile necessary for setting the composite material.

Through the perforation prior to the moulding, a subsequent perforation working step and the relative working station are avoided, thus saving the manufacturing time and costs associated with this perforation working step and with the operation of programming the machine. Moreover, by making the seats through displacement of the structural fibers and therefore substantially without removal of structural fiber, holes are obtained that are substantially without burrs and sheared fibers which conversely result with the usual material removal machining and which represent a danger of injuries for the operator, therefore increasing the safety of the production line. Moreover, the fibers that gather about the edge of the hole involve an advantageous local reinforcement in such region, which is critical from the point of view of the stresses.

It should be understood that in the hole made through displacement of structural fibers, shearing could also take place, but only of a scarce number of fibers that are located right at the tip end of the tool.

At the same time, a step of slightly heating the polymeric material can take place, so as to decrease its viscosity and increase the capability of the structural fibers to move within the polymeric material. Of course, with a polymeric material of the composite material of the thermosetting type, the temperature of the tool must be lower than the cross-linking temperature thereof. The heating must moreover take place at such a temperature as to avoid the polymeric material dripping into the hole.

Alternatively or in addition, the manufacturing process can comprise a step of sealing the seats during said moulding step, more preferably through an auxiliary element having a shank and a head, the shank of which is inserted in the hole of the mould. After moulding, the auxiliary element is removed. The auxiliary element can be used as said tool, the perforation and the sealing taking place together. The auxiliary element is made of a material that has features of deformability, resistance to the moulding temperatures and pressures of the composite material and/or non-adherence to the composite material. A particularly preferred material is latex or soft silicone rubber, for example a silicone having a Shore A hardness 50.

Typically, the rim can comprise an insert having a through hole, the insert being constrained to, and preferably co-moulded with, said composite material at said at least one seat.

The insert advantageously increases the resistance of the rim to the tensile stresses from the spokes of the wheel. The optional provision of constraining the insert to the composite material prevents wearing by friction due to the sliding of the insert on the composite material.

If the aforementioned manufacturing process is used, the auxiliary element is also inserted in the hole of the insert during moulding.

When the wall delimits the rim in its radially inner region, the layer of woven bi-directional fibers preferably has a size, measured in the radial section, greater than or equal to 10 mm and even more preferably greater than or equal to 15 mm.

With reference to the drawings, FIG. 1 shows a portion, in particular a circular sector, of a bicycle wheel rim 10 according to a first embodiment of the present invention, with a radial section highlighted. FIG. 1 indicates the axial direction A, the circumferential direction C, the radial direction R, the median plane M of the rim 10, and a half-plane of radial section P.

When mounted in a bicycle wheel, the rim 10 is connected to a hub (not shown) through spokes (not shown) and the tire (not shown) is typically mounted thereon. Typically, the rim 10 has a hole (not shown) for the insertion of an inflation valve (not shown) of the tire or of the inner tube.

In particular, in the case illustrated the tire is mounted in a tire coupling channel 12 defined in a radially outer region 14 of the rim 10. The spokes have respective radially outer ends seated in respective spoke attachment seats 22 formed in a radially inner region 20 of the rim 10.

The tire coupling channel 12 is delimited by a substantially cylindrical bottom 16 and by two lateral flanges 18 projecting outwards—in a generically radial direction—from the bottom 16 of the channel 12 and folded towards one another so as to form undercut regions for holding the beads (or bead wires) of the clincher.

The spoke attachment seats 22 are formed in a wall 24—sometimes called "lower bridge" in the field—of the radially inner region 20 of the rim 10. As described in the introductory part, such a wall can have a more or less cylindrical shape. In the specific example shown, the wall 24 has a cross-sectional shape slightly curved with concavity radially outwards. The central area of the wall 24 in any case extends in a substantially axial direction A. Lateral walls 25 join the channel 12 to the wall 24.

The rim 10 is made of composite material. Alternatively, the rim 10 could comprise a radially outer rim component made of metallic material, only the radially inner region 20 being made of composite material. For the purposes of the present invention, it is even sufficient that only the wall 24 is made of composite material.

The composite material of the wall 24 comprises structural fibers incorporated in a thermosetting polymeric material.

In particular, the composite material of the wall 24 comprises one or more layers 26 of woven bi-directional fibers 28, 29 incorporated in a thermosetting composite material.

FIG. 1 shows a layer 26 of woven bi-directional fibers comprising first fibers 28, the nominal direction of which is substantially parallel to the circumferential direction C of the rim 10, and second fibers 29, the nominal direction of which is substantially orthogonal to the first fibers 28 and preferably extends, in the radial section of the rim 10, along the wall 24.

The second fibers 29 therefore extend in a substantially axial direction A, at least in the central area of the wall 24.

Each layer 26 has a thickness comprised in the range between 0.1 and 0.3 mm, end-points included. For example, the layer 26 has a thickness equal to about 0.25 mm.

Typically, a number of layers 26 comprised in the range between 1 and 4 are provided for. For example, the layers 26 can be 3 in number.

As described in detail in the introductory part, the first fibers 28 provide resistance against the deformations from the circular shape caused by forces acting locally along the radial direction R, for example by the different tension of the various spokes or by roughness of the terrain.

The second fibers 29 provide resistance against lateral impacts, acting substantially in axial direction A.

Moreover, the second fibers 29, being interwoven with the first fibers 28, stabilize the first fibers 28 tending to keep them both in their nominal direction, substantially circumferential C, and in the respective axial position or, better, in the respective position along the radial section. In other words, also after moulding, the first fibers 28 tend to form circumferences extending in planes that are well distributed and parallel to one another. As a result, the density of the first fibers 28 is also kept substantially constant.

Moreover, this effect of stabilization in position allows the wall 24 formed by the aforementioned at least one layer 26 of first fibers 28 and second fibers 29 to be made wider, when observed in the half-plane of radial section P, with respect to walls made with known orientation of the fibers. As schematized in FIG. 3, where the rim 100 on the left represents the prior art and the rim 10 on the right represents the invention, the layer(s) 26 of woven bi-directional fibers 28, 29 of the invention can climb more along the two lateral walls 25 of the rim 10 with respect to the prior art. In particular, the "heights" H3 and H4 of the layer(s) 26 along the lateral walls are greater than the corresponding "heights" H1 and H2 of the layer(s) 126 of composite material that are possible in the case of the prior art. Preferably, H3 and H4 have a comparable size.

Figure 3:
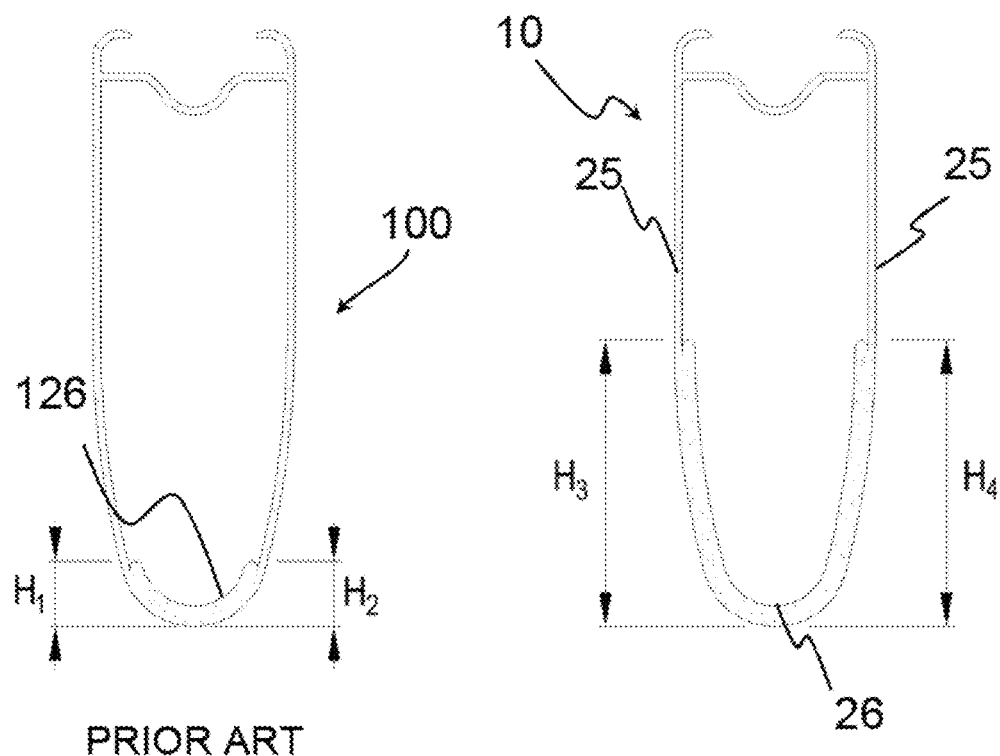
FIG. 3 schematically illustrates a radial section of a bicycle wheel rim according to the prior art and a radial section of a bicycle wheel rim according to the invention compared with each other.

Preferably, the size or dimension of the layer(s) 26, measured in the radial section, illustrated in FIG. 3 and including the "heights" H3 and H4, is greater than or equal to 10 mm, more preferably it is greater than or equal to 15 mm.

Figure 4:
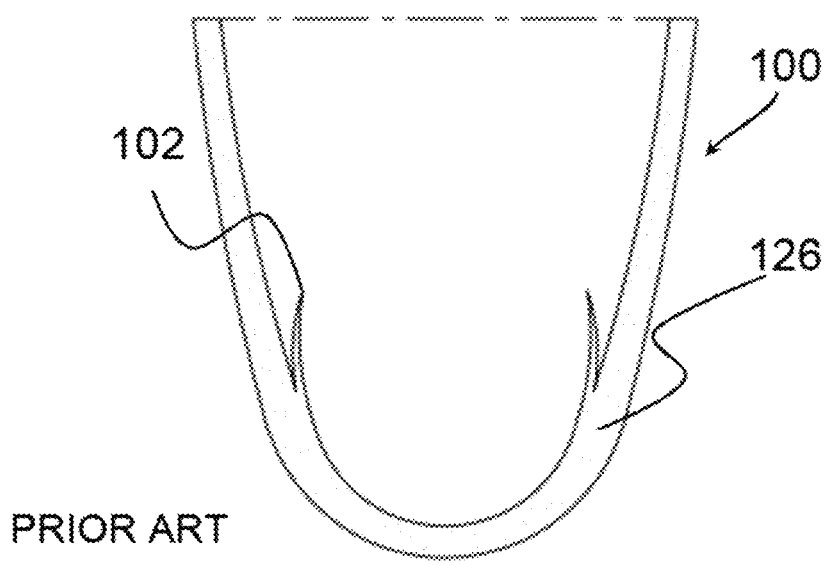
FIG. 4 schematically illustrates a radial section of a defective bicycle wheel rim according to the prior art.

Indeed, in the case of the orientation of fibers according to the prior art, particularly in the case of unidirectional fibers extending in the circumferential direction, if said "heights" H1 and H2 are too great, there is a delamination phenomenon of the layers, illustrated in a totally schematical manner in FIG. 4. FIG. 4 represents two detachments 102 at the sides of the layer 126 of composite material, namely at the outermost fibers (in axial direction A), on either side of the rim 100.

Going back to the rim of the invention, the first fibers 28 and the second fibers 29 preferably form substantially uniform meshes in the layer 26 of bi-directional fibers.

Figure 2:
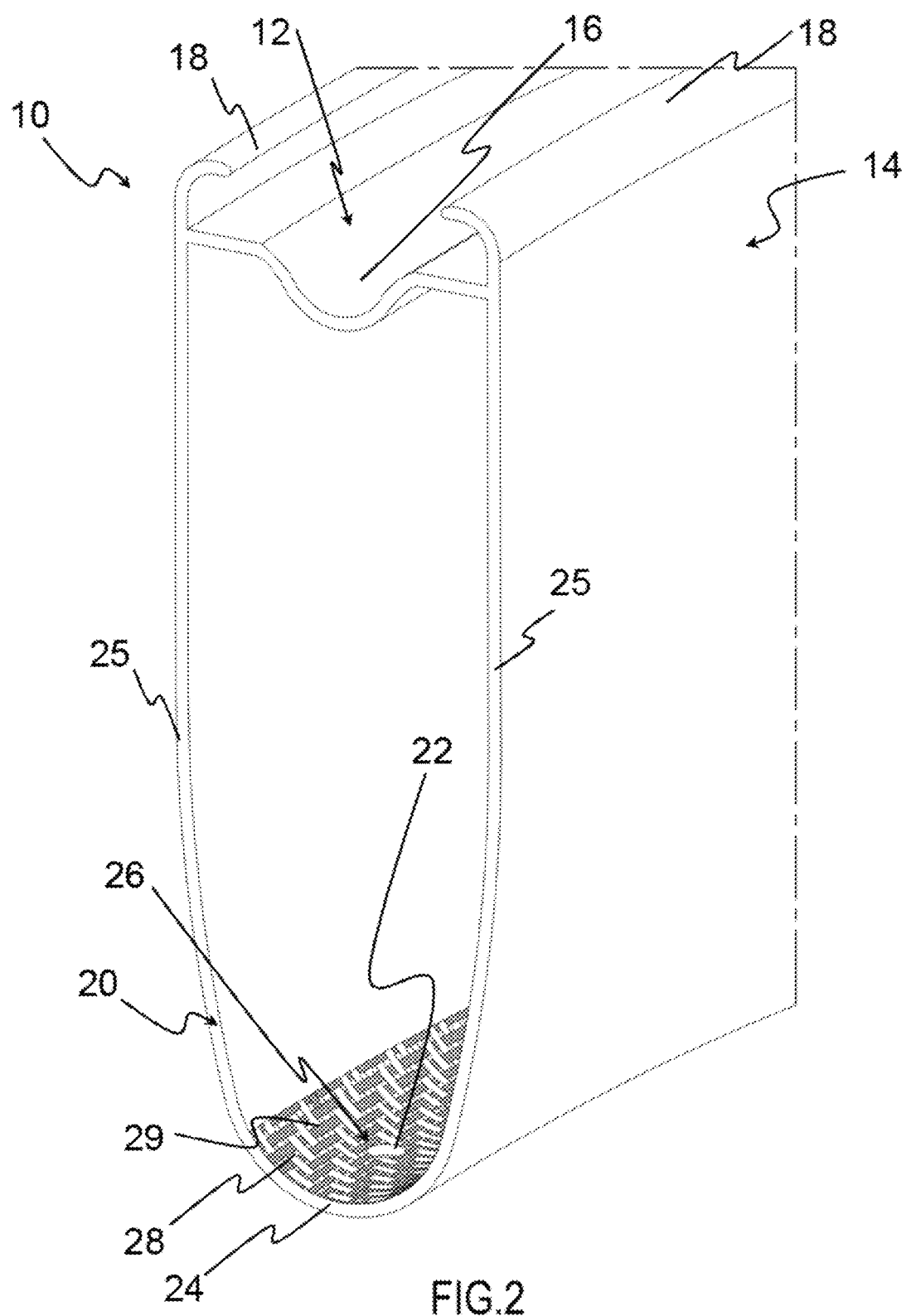
FIG. 2 schematically illustrates a perspective view of a portion of a second embodiment of a bicycle wheel rim according to the invention, highlighting a radial section thereof.

Merely as an example, FIG. 1 shows a weave of the plain weave type, while FIG. 2 shows a weave of the twill weave type.

Figure 5:
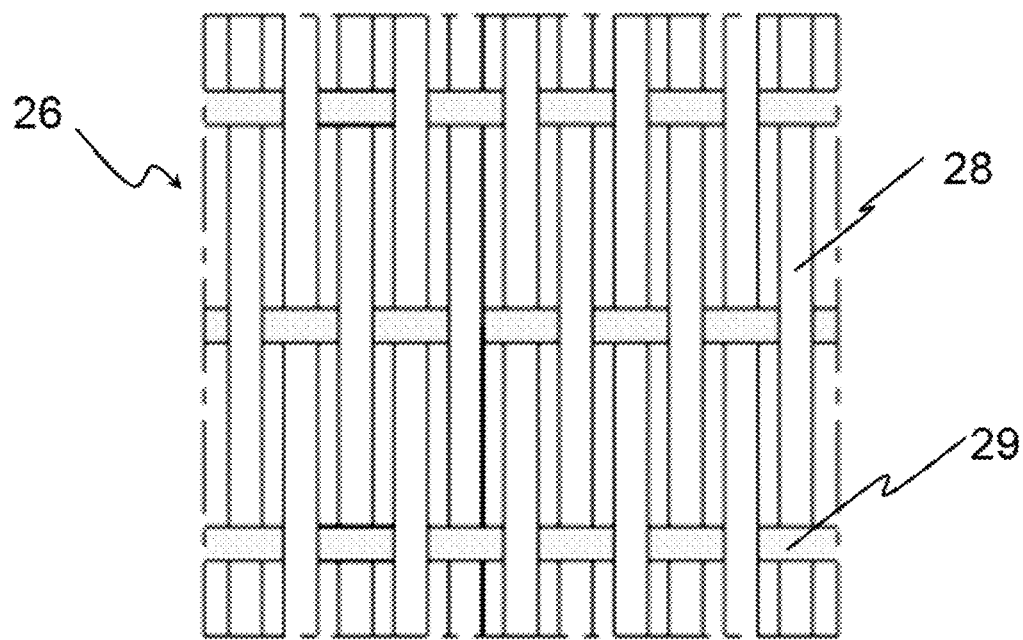
FIG. 5 schematically illustrates a plan view of a detail of a bicycle wheel rim according to an embodiment of the present invention.

While FIGS. 1 and 2 show "balanced" weaves, the density of the first fibers 28 can be different, and preferably greater, than the density of the second fibers 29. Merely as an example, an unbalanced plain weave is shown schematically in FIG. 5.

Thanks to a different density and/or to a different grammage and/or to a different tensile strength between the first fibers 28 and the second fibers 29, it is advantageously possible to form the layer(s) 26 so that there is a stiffness ratio between the first fibers 28 and the second fibers 29 of value selected between about 90:10 and about 50:50, end-points included; preferably between about 70:30 and 60:40, end-points included, a stiffness ratio equal to about 70:30 being preferred.

In the case of the "balanced" fabrics shown in FIGS. 1 and 2, wherein the fibers 28, 29 form substantially square meshes in the layer 26, the density of the first fibers 28 is equal to the density of the second fibers 29.

If the grammages and the tensile strengths of the first and second fibers 28, 29 are also equal, the stiffness ratio between the first fibers 28 and the second fibers 29 of the layer 26 is about 50:50.

As for the materials constituting the fibers, the possible grammages, the tensile strengths and the densities of the fibers, reference is made to the introductory part of the present description. It should also be observed that in a particularly advantageous fabric, the first fibers 28 are carbon fibers and the second fibers 29 are fibers different than carbon fibers, for example they are glass fibers.

Figure 6:
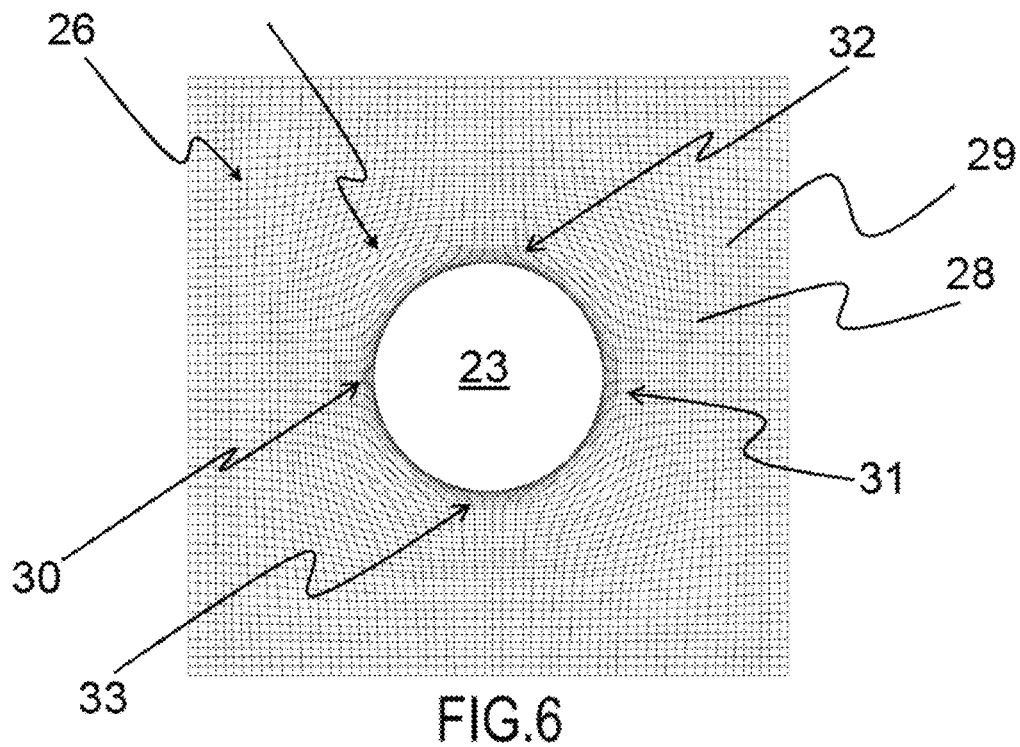
FIG. 6 schematically illustrates a plan view of another detail of a bicycle wheel rim according to an embodiment of the present invention.

FIG. 6 schematically shows a plan view of a region of the wall 24, represented by way of an example in the embodiment with balanced plain weave—and a hole 23 of a spoke attachment seat 22 formed in the wall 24 according to the known process of displacement of fibers—in opposition to their shearing—summarized above.

The progression of the first and second fibers 28, 29 about the hole 23 can be observed. It is worthwhile emphasizing that such progression of the first and second fibers 28, 29 is that which remains in the finished rim 10 after the moulding step.

In FIG. 6, an amassment 30 of first structural fibers 28 on the left of the hole 23, an amassment 31 of first structural fibers 28 on the right of the hole 23, an amassment 32 of second structural fibers 29 above the hole 23, and an amassment 33 of second structural fibers 29 below the hole 23 can be observed. In this way, some bi-directional fibers 28, 29 take up a substantially curvilinear progression about the hole 23, in particular substantially semi-circular. Of course, in the real case the progressions of the fibers 28, 29 and of the amassments 30-33 can diverge from the ideal one represented in FIG. 6.

The first and second fibers 28, 29, gathering about the edge of the hole 23, therefore result in an advantageous local reinforcement in such a region, which is critical from the point of view of the stresses.

The first and second fibers 28, 29 of the layer 26 can be woven also according to other types of weave, besides plain weave and twill weave.

When there is more than one layer 26, the layers can differ in one or more of the aforementioned features, namely material, type of weave, size ("heights" H3, H4), stiffness ratio between the first fibers 28 and the second fibers 29.

It is moreover specified that in the rim 10, besides the layer(s) 26 of bi-directional fibers 28, 29, other layers of composite material are typically provided for, in which the fibers can be unidirectional or woven, but they extend according to other directions with respect to the nominal circumferential direction C of the first fibers 28 and to the nominal direction of the second fibers 29 orthogonal to the first fibers 28. Typically, these other layers have fibers in the nominal directions at ±45° or at ±60° with respect to the circumferential direction C.

The shape in radial section of the rim 10 shown in the various figures is purely indicative and in practice it can differ even remarkably from that shown. Merely as an example, it should be observed that the rim 10 shown is configured for coupling with a clincher, tubeless or with inner tube. However, it should be understood that the invention also applies to rims for wheels with tubular or sew-up tires, wherein the radially outer region of the rim has, in section, a concavity outwards, which forms a shallow annular channel. Moreover, although a rim "with high profile" is shown, the invention also applies to a rim with medium or low profile; although a symmetrical rim is shown, the invention also applies to an asymmetrical rim.

The rim 10 can be used in a spoked wheel or in a lenticular or disc wheel or in a spider wheel, in which case the spokes extending in the spoke attachment seats 22 can be kept in the final wheel, inside or hidden by the discs or the spider legs, or they can be used only during a manufacturing step as described in the aforementioned EP 2674304 A1 and equivalent U.S. Pat. No. 9,724,959.

Of course, those skilled in the art can make further changes, replacements and omissions of the various components in the above described invention in order to satisfy specific and peculiar application requirements, in any case encompassed by the scope of protection as defined by the following claims.

What is claimed is:

1. A bicycle wheel rim comprising:
a tire coupling channel, lateral walls that are joined to the tire coupling channel and a wall that is positioned opposite to the tire coupling channel and joined to the lateral walls, wherein the wall opposite to the tire coupling channel is made of composite material comprising structural fibers incorporated in a thermosetting polymeric material, and has a plurality of spoke attachment seats formed therein, wherein the composite material of the wall comprises at least one layer of woven bi-directional fibers, comprising first fibers having a nominal direction which is substantially parallel to a circumferential direction (C) of the rim, and second fibers interwoven with the first fibers and having a nominal direction which is substantially orthogonal to that of the first fibers, and some of the interwoven fibers are substantially curvilinear about the plurality of spoke attachment seats.

2. The rim according to claim 1, wherein said nominal direction of said second fibers substantially extends along said wall in a radial section of the rim.

3. The rim according to claim 1, wherein in said at least one layer of bi-directional fibers the first fibers have a stiffness that is greater than or equal to a stiffness of the second fibers.

4. The rim according to claim 3, wherein a total stiffness of said first fibers and said second fibers is calculated as a product of: dry fiber grammage of the structural fibers, dry fiber tensile strength of the structural fibers, and dry fiber density of the structural fibers.

5. The rim according to claim 3, wherein a ratio between the stiffness of the first fibers and the stiffness of the second fibers of said at least one layer is between about 90:10 and about 50:50, end-points included.

6. The rim according to claim 1, wherein the first fibers are carbon fibers.

7. The rim according to claim 1, wherein the second fibers are fibers different than carbon fibers.

8. The rim according to claim 1, wherein the first and second fibers are woven according to a selected one of a plain weave or a twill weave.

9. The rim according to claim 1, wherein the first and second fibers have independently selected values of dry fiber grammage in the range between 80 and 800 g/m², end-points included.

10. The rim according to claim 1, wherein the first and second fibers have independently selected values of dry fiber tensile strengths that are in the range between 6600 MPa and 2500 MPa, end-points included.

11. The rim according to claim 1, wherein the first and second fibers have independently selected values of dry fiber densities in the range between 0.9 g/cm³ and 3.5 g/cm³, end-points included.

12. The rim according to claim 1, wherein said wall delimits the rim in its radially inner region.

13. The rim according to claim 12, wherein said at least one layer of woven bi-directional fibers has a dimension, other than a thickness, measured in the radial section, greater than or equal to 10 mm.

14. The rim according to claim 1, wherein each seat is defined by a hole formed in said wall by structural fibers boarding said hole.

15. A bicycle wheel comprising a rim according to claim 1.

16. The rim according to claim 1, wherein the second fibers are glass fibers.

17. The rim according to claim 1, wherein the first and second fibers are independently selected, and the first and second fibers have dry fiber grammages in the range between 100 and 300 g/m2, end-points included.

18. The rim according to claim 1, wherein the first and second fibers are independently selected, and the first and second fibers have dry fiber tensile strengths in the range between 6400 MPa and 3500 MPa, end-points included.

19. The rim according to claim 1, wherein the first and second fibers are independently selected, and the first and second fibers have a dry fiber density in the range between 1.7 and 2.7 g/cm3, end-points included.

20. The rim according to claim 12, wherein said at least one layer of woven bi-directional fibers has a dimension, other than a thickness, measured in the radial section, greater than or equal to 15 mm.

21. A bicycle wheel rim comprised of:
a tire coupling channel, lateral walls that are joined to the tire coupling channel and a wall that is positioned opposite to the tire coupling channel and joined to the lateral walls, wherein the wall opposite to the tire coupling channel is made of between 1 to 4 layers of a composite material including structural fibers incorporated in a thermosetting polymeric material, wherein the structural fibers are woven bi-directionally with a first set of fibers having a nominal direction which is substantially parallel to a circumferential direction (C) of the rim and a second set of fibers having a nominal direction which is substantially orthogonal to that of the first set of fibers, and a plurality of spoke attachment seats are formed in said wall;
wherein each of the between 1 and 4 layers has a thickness between 0.1 mm and 0.3 mm, and some of the interwoven fibers are substantially curvilinear about the plurality of spoke attachment seats.

22. The bicycle wheel rim of claim 21 wherein each of the between 1 and 4 layers has a dimension, other than a thickness, measured in the radial section, greater than or equal to 10 mm.

* * * * *